United States Patent [19]

Kelleher et al.

[11] Patent Number: 5,008,838
[45] Date of Patent: Apr. 16, 1991

[54] METHOD FOR SIMULTANEOUS INITIALIZATION OF A DOUBLE BUFFER AND A FRAME BUFFER

[75] Inventors: Brian M. Kelleher; Zahid Hussain, both of Palo Alto, Calif.

[73] Assignee: Digital Corporation, Maynard, Mass.

[21] Appl. No.: 438,649

[22] Filed: Nov. 17, 1989

[51] Int. Cl.⁵ .................................................. G06F 3/14
[52] U.S. Cl. ..................................... 364/522; 340/729; 340/701
[58] Field of Search ..................... 364/521, 518, 522; 540/701, 703, 729, 734, 790, 799, 793

[56] References Cited

U.S. PATENT DOCUMENTS

| | | | |
|---|---|---|---|
| 4,679,041 | 7/1987 | Fetter et al. | 340/747 |
| 4,688,190 | 8/1987 | Bechtolsheim | 364/900 |
| 4,697,178 | 9/1987 | Meckel | 340/729 |
| 4,701,863 | 10/1987 | Bruce | 364/518 |
| 4,766,556 | 8/1988 | Arakawa | 364/522 |
| 4,907,174 | 3/1990 | Priem | 364/522 X |

*Primary Examiner*—David L. Clark
*Attorney, Agent, or Firm*—Flehr Hohbach Test Albritton & Herbert

[57] ABSTRACT

A method is provided for generating pixel color information for use in producing an image of a line segment on a graphics display screen, the method comprising the steps of: denoting at least one planar region of the display screen that encompasses the line segment; assigning respective intensity values for at least three selected pixels encompassed by the at least one planar region; assigning respective color values for the at least three selected pixels; and interpolating respective final color values for each respective pixel encompassed by the at least one planar region based upon the respective assigned intensity values and the respective assigned color values.

10 Claims, 10 Drawing Sheets

METHOD FOR SIMULTANEOUS INITIALIZATION OF A DOUBLE BUFFER AND A FRAME BUFFER

BACKGROUND OF THE INVENTION

1. Field of the Invention

The invention relates generally to graphics display systems and more particularly to initializing of double buffers and frame buffers in a graphics display system.

2. Description of the Related Art

In a typical graphics processing system, a graphics processor processes geometric and color information so as to render pixel information used to control the illumination of individual pixels on a graphics display screen. Graphics color information stored in a frame buffer is used to control the illumination of pixels on the screen. The color information in the frame buffer must be periodically updated. Ordinarily, updating is accomplished by initializing a double buffer and a depth buffer; then updating the double buffer and the depth buffer; and then copying updated information from the double buffer to the frame buffer. During updating of the double buffer and the depth buffer, depth information stored in the depth buffer is used to determine whether or not color information stored in the double buffer and corresponding to one image should be written over color information corresponding to another image.

One problem with earlier graphics systems concerns the amount of time required to initialize a double buffer and the depth buffer. Initialization involves writing respective starting color values and starting depth values to each pixel storage element of the respective depth and double buffers.

Thus, there has been a need for a method for more rapidly initializing a double buffer and a depth buffer. The present invention meets this need.

SUMMARY OF THE INVENTION

In one aspect, the present invention provides a method for initialization of a double buffer and a depth buffer of a graphics image rendering system. The method involves writing a background color value to each pixel storage element of the double buffer, and writing the same background color value to each pixel storage element of the depth buffer.

In another aspect, the invention provides a method for rendering a graphics image. The method includes the step of periodically writing a background color value to each pixel storage element of the double buffer, and periodically writing the same background color value to each pixel storage element of the depth buffer. For each respective pixel of the graphics display screen, the method also comprises the step of calculating a depth value for a corresponding pixel storage element of the depth buffer by mapping to a depth value scaled according to the binary value representing the background color. A color value is calculated for a corresponding pixel storage element of the double buffer. A currently stored depth value is read value from the corresponding pixel storage element of the depth buffer. The calculated depth value is compared to the currently stored depth value. If the calculated depth value represents a lesser depth than the currently stored depth value, then the calculated depth value is written into the corresponding pixel storage element of the depth buffer, and the calculated color value is written into the corresponding pixel storage element of the double buffer.

The method of the present invention advantageously permits the double buffer and the depth buffer to be simultaneously initialized using a background color value. Such simultaneous initialization permits a graphics system to more rapidly process information used to generate graphics images.

These and other features and advantages of the present invention will become apparent from the following description of an exemplary embodiment thereof, as illustrated in the accompanying drawings.

BRIEF DESCRIPTION OF THE DRAWINGS

The purpose and advantages of the present invention will be apparent to those skilled in the art from the following detailed description in conjunction with the appended drawings in which:

FIG. 4b is a block diagram showing details of the first memory unit of the system of FIG. 4a;

FIG. 5a is an example of a line segment on the graphics screen of the preferred embodiment of FIG. 4a;

FIG. 5b illustrates a parallelogram produced by the interface unit of the preferred embodiment of FIG. 4a;

FIG. 6 illustrates a tile element of the display screen of the embodiment of FIG. 4a;

FIG. 8 is a schematic diagram of an underflow/overflow correction circuit of the graphics processors of the embodiment of FIG. 4a.

DETAILED DESCRIPTION OF THE PREFERRED EMBODIMENT

Figure 1:
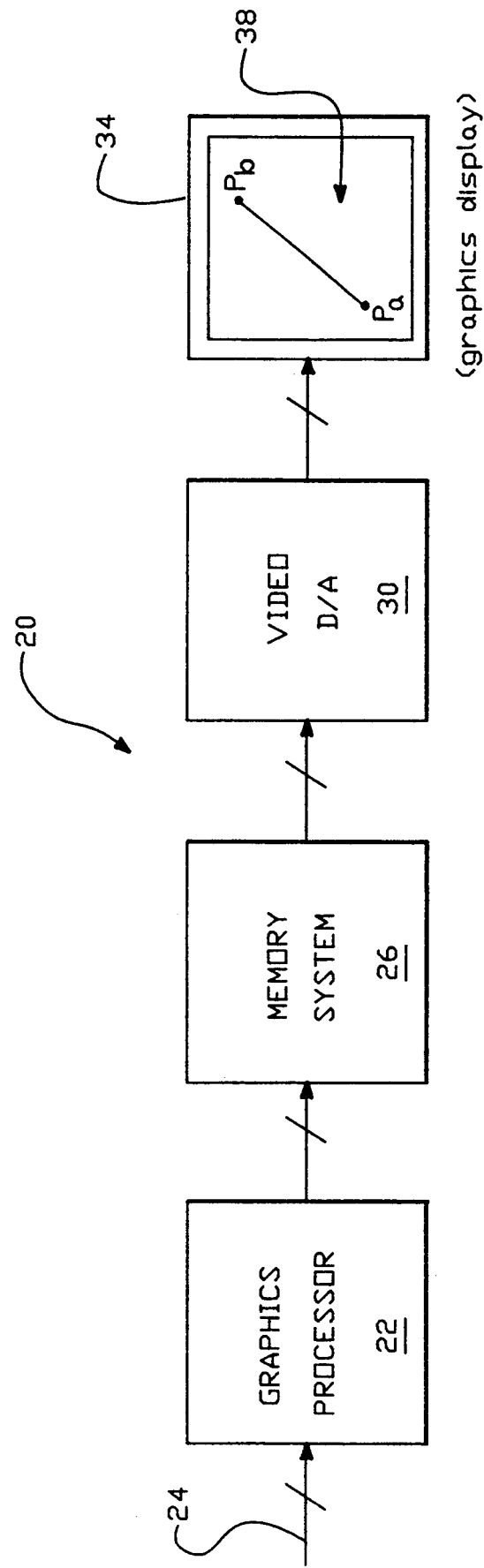
FIG. 1 is a block diagram of a typical earlier processing system.
Figure 2:
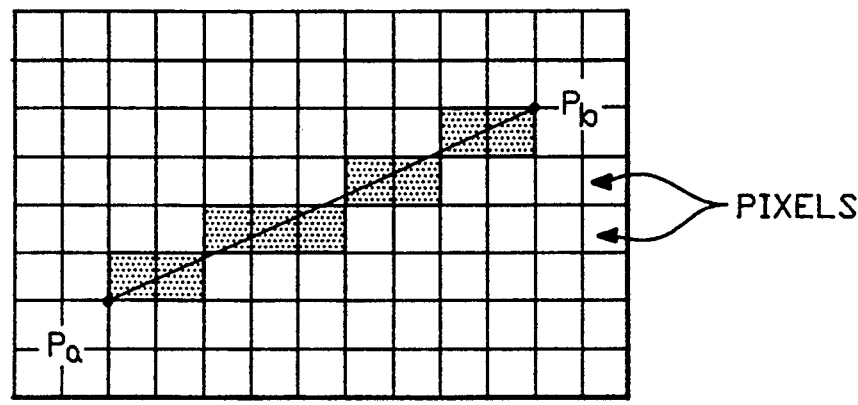
FIG. 2 is an example of a line segment on the graphics screen of the processing system of FIG. 1 illustrating a staircase effect.
Figure 3:
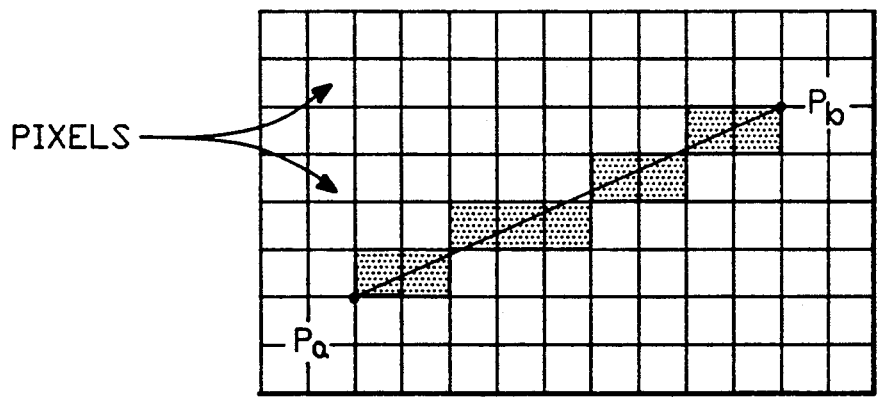
FIG. 3 is an example of the line segment of FIG. 2 illustrating a diminished staircase effect.

The present invention comprises a novel method for initializing a double buffer and a depth buffer in a graphics display system. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Referring to the illustrative drawings of FIG. 4, there is shown a block diagram of a processing system 40 of a presently preferred embodiment of the invention. The processing system 40 includes a main processor 41 (within dashed lines) and a graphics unit 42 (within dashed lines). The main processor 41 provides geometric and color information on line 56. The graphics unit 42 processes the geometric and color information so as to render digital pixel color and pixel depth information. The video digital-to-analog converter 43 converts the digital pixel color information into analog information that can be used by a graphics display 47 to portray an image, such as an image of line segment $P_1P_2$, on a graphics display screen 48.

The present invention provides a novel method for initializing a double buffer and a depth buffer in a graphics system. In a present embodiment, the method involves simultaneously writing pixel background color information into each pixel storage element of the double buffer and into each pixel storage element of the depth buffer.

The main processor 41 includes a central processing unit 44, a floating point processing unit 46, a cache memory 50 and a main memory 52, all of which are coupled to a 32-bit bus 54. The main processor 41 runs application programs that produce the geometric and color information that can be processed by the graphics unit 42.

The graphics unit 42 includes an interface unit 58, first and second graphics processors 60, 62 and first and second memory units 64, 66. The interface unit 58 receives the geometric and color information from the main processor 41 and uses that received information to produce parameters used by the first and second graphics processors 60, 62 to produce the pixel color and depth information which is then stored in the respective first and second memory units 64, 66.

In operation, an application running on the main processor 41, for example, can provide geometric and color information for multiple different, and possibly overlapping, images to be produced on the display screen 48. The graphics unit 42 individually processes the information for each such different image and stores the resulting information in its memory units 64, 66. For each such different image, the interface unit 58 produces a different set of parameters. The first and second graphics processors 60, 62 use the parameters produced by the interface unit 58 to determine which pixels on the screen 48 are to be illuminated with what colors in order to portray the image.

More specifically, the first and second graphics processors 60, 62, in response to the parameters produced by the interface unit 58, perform a linear interpolation in order to determine the pixel color and depth information to be stored in the first and second memory units 64, 66. Furthermore, the graphics processors 60, 62 use an edge-seeking algorithm to identify the geometric "edges" of an image to be portrayed on the screen 48 in order to determine which pixels are to be involved in portraying such an image. Each pixel color storage element contains twenty-four bits of RGB color information: eight bits for red, 8 bits for green, and eight bits for blue. Moreover, each Pixel depth storage element also includes twenty-four bits of depth information. The first and second graphics processors 60, 62 each process pixel information (color or depth) for five pixels at a time; that is, 120 bits of information at a time. Thus, the two graphics processors 60, 62 together can simultaneously process the color or depth information for ten pixels (240 bits) at a time.

The first and second memory units 64, 66 comprise a plurality of dual-port random access memories. Each respective pixel on the graphics display screen 48 corresponds to a different respective 24-bit pixel color storage element of one of either the first or the second memory units 64, 66. Also, each respective pixel on the screen corresponds to a different respective 24-bit pixel depth storage unit. In order to generate a visual image on the screen 48 based upon stored pixel color information, the stored pixel color information is read from the memories 64, 66 and is provided to the video digital-to-analog converter 43. The converter 43 produces analog signals used by the graphics display 47 to generate the image. Thus, for each dual-port RAM, one port is used for access by one of the graphics processors 60, 62, and the other port is used for access by the video digital-to-analog converter 43.

In order to permit the appearance of continuous or smooth motion of images portrayed on the screen 48, the images typically are updated on the order of at least ten times per second. In the course of each updating of images, the contents of the pixel color storage elements for every pixel on the screen 48 are initialized. During each initialization, the contents of each pixel color storage element and each pixel depth storage element of the first and second memory units 64, 66 is set to a background color value. The geometric and color information provided by the main processor 41 then is used by the graphics unit 42, as described above, to determine which respective pixels on the screen 48 are to be illuminated with a color other than the background color, and to access the corresponding respective pixel color storage elements so as to store pixel color information that corresponds to such different colors.

The process of initializing pixel depth storage elements and pixel color storage elements now will be explained in more detail. Referring to the drawings of FIG. 4b, there is shown a block diagram illustrating details of the first memory unit 64. It will be appreciated that the first and second memory units 64, 66 are substantially identical, and that the following discussion applies to the second memory unit 66 as well. The first memory unit 64 includes a depth buffer (Z buffer) 86, a double buffer 88 and a frame buffer 90, all of which are coupled to a shared 120-bit data bus 92. First control lines 94 provide row/read/write control signals to the depth, double and frame buffers 86, 88, 90. Second control lines 96 provide separate chip-enable signals to each of those three buffers.

Each pixel on the display screen 48 corresponds to a respective 24-bit pixel depth storage element of the depth buffer 86, to a respective 24-bit pixel color storage element of the double buffer 88 and to another respective 24-bit pixel color storage element of the frame buffer 90. As explained below, respective pixel depth storage and pixel color storage elements of the three buffers are logically organized into respective five-element units which correspond to five out of ten pixels of respective 5×2 tile elements. The other five pixels of a respective tile element correspond to respective pixel depth storage and pixel color storage elements of the second memory system 66.

Figure 4A:
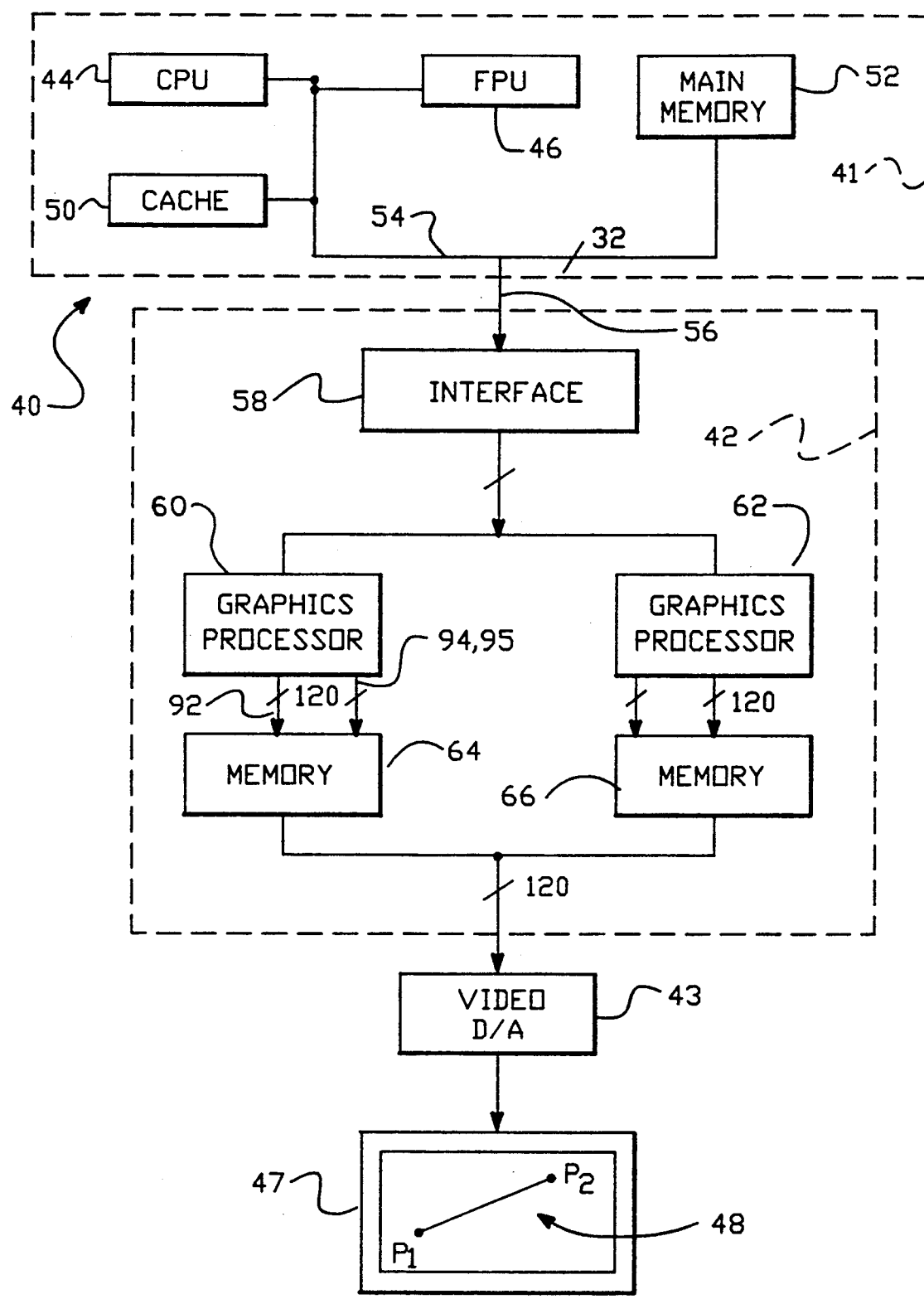
FIG. 4a is a block diagram of a processing system in accordance with a presently preferred embodiment of the invention.
Figure 4B:
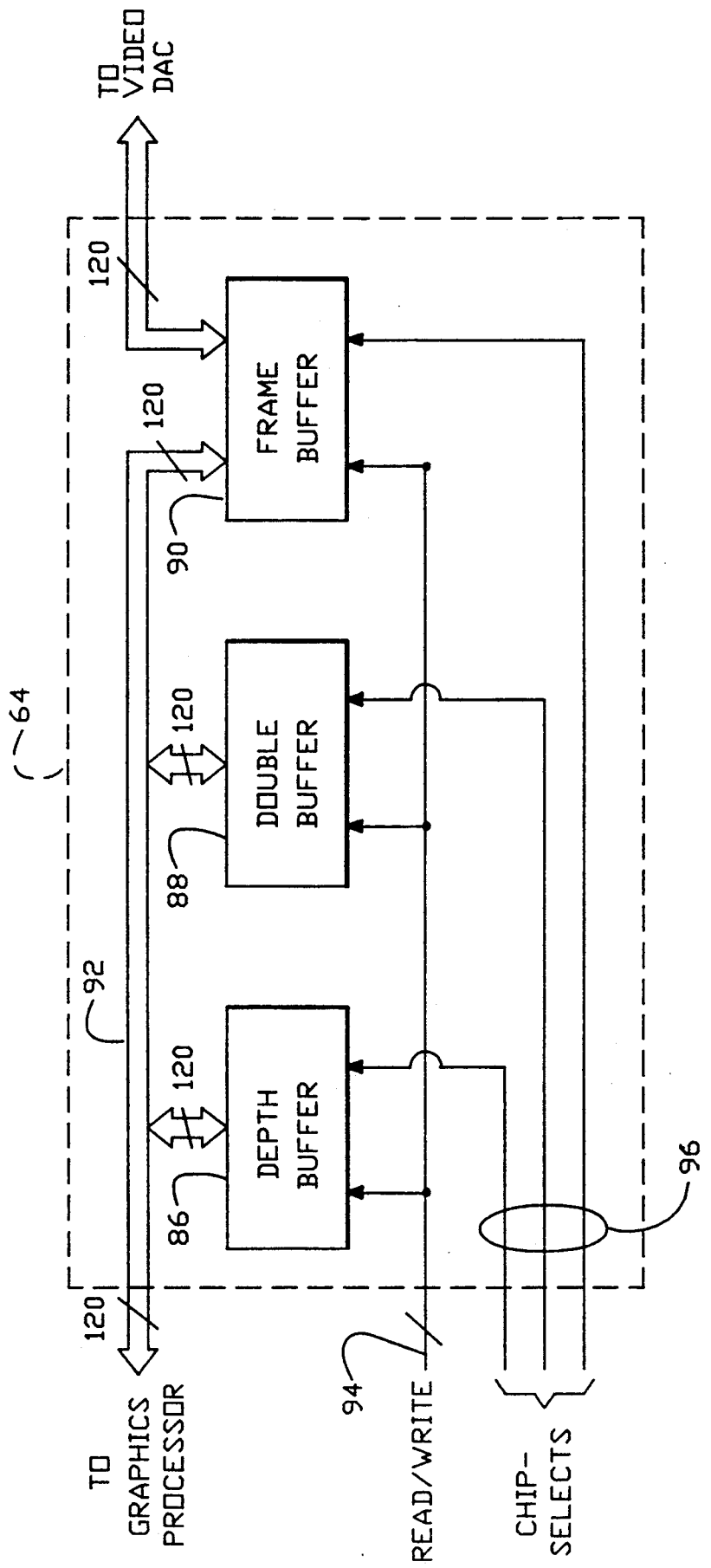
Figure 4C:
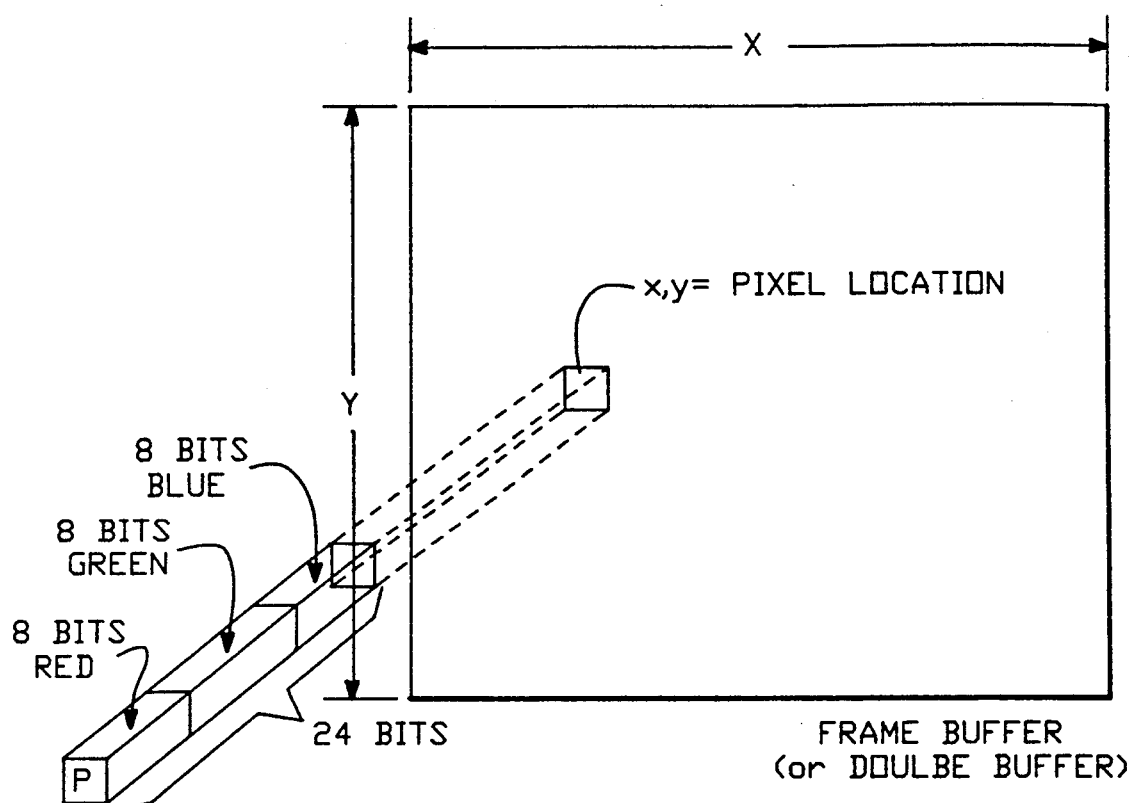
FIG. 4c is a conceptual diagram of a pixel color element of the frame buffer (or double buffer) of the first memory unit of FIG. 4b.
Figure 4D:
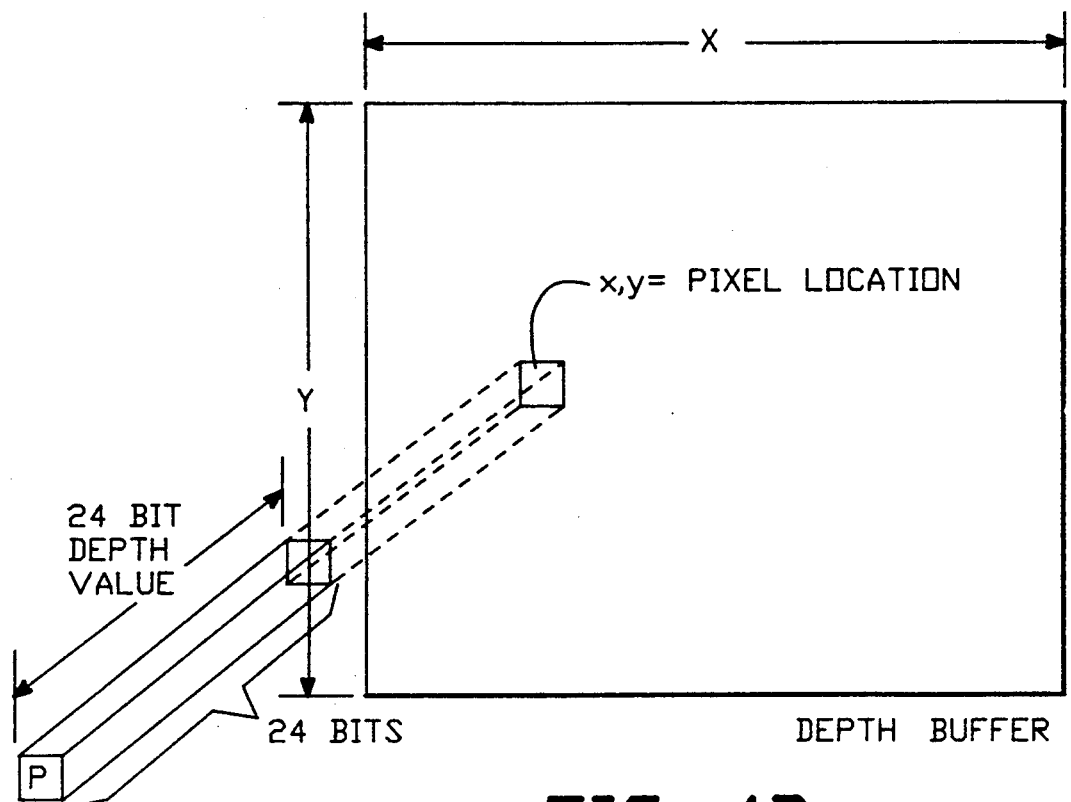
FIG. 4d is a conceptual diagram of a pixel depth element of the depth buffer of the first memory unit of FIG. 4b.

Referring to the illustrative drawings of FIG. 4c, there is shown a conceptual drawing of a 24-bit pixel color storage element. Eight bits represent red; eight bits represent green; and eight bits represent blue. For each pixel color storage element of the double buffer 88, there is an identical corresponding pixel color storage element of the frame buffer 90. Referring to the illustrative drawings of FIG. 4d, there is shown a conceptual drawing of a 24-bit pixel depth storage element. All twenty-four bits can be used to represent a depth.

In order to produce an image on the display screen, stored pixel color information is read from the frame buffer 90 and is provided to the video digital-to-analog converter (DAC) 43. The DAC 43 converts these digital values into analog signal values used by the graphics display 47 to produce an image on the screen 48.

In order to create a smoothly animated image, the pixel color information in the frame buffer 90 should be updated and provided to the DAC 43 at least approximately ten times per second. The process of updating the contents of the frame buffer 90 involves first updating the contents of the double buffer 88, and then copying the contents of the double buffer 88 into the frame buffer 90.

In an alternative embodiment (not shown), for example, instead of copying the contents of a double buffer into a frame buffer after the contents of such a double buffer have been updated, outputs from such a double buffer and such a frame buffer can be multiplexed (or switched) such that the roles of the two buffers are reversed. In that case, the most recently updated one of the two buffers is coupled to provide pixel color information directly to a DAC. While the other buffer operates as a double buffer and is updated with new pixel color information.

Updating of the double buffer 88 involves simultaneously initializing both the depth buffer 86 and the double buffer 88. Initialization involves writing a single 24-bit pixel depth value to all pixel depth storage elements of the depth buffer 86, and involves writing a single 24-bit pixel color value to all pixel color storage elements of the double buffer 88. In accordance with the present invention, during initialization, the same 24-bit value is written to all pixel storage elements of both the depth buffer 86 and the double buffer 88. In particular, that same 24-bit value is a 24-bit value representing a background color specified by an application program running on the main processor 41.

The first graphics processor 60 controls such simultaneous initialization by providing on the first control lines 94, read/write control signals that instruct the depth and double buffers 86, 88 to write information from the shared 120-bit bus 92. In the course of providing such write signals, the first graphics processor 60 provides on the second control lines 96, chip-enable signals that cause both the depth buffer 86 and the double buffer 88 to simultaneously write digital information provided by the first graphics processor 60 on the shared bus 92. The graphics processor 60 provides 24-bit pixel (background) color values on the 120-bit shared bus 92 for five pixels at a time until all pixel storage elements of the depth and storage elements have been initialized by loading all of them with the same pixel value.

In the presently preferred embodiment, the process of updating the frame buffer 90 also involves the application of hidden surface removal techniques. These techniques can ensure that, where multiple images in a view overlap one another, only the closer of those images is visible in the view. Portraying the closer image involves ensuring that pixel color information for the closer of such overlapping images is stored in the double buffer 88 for any pixels for which such images overlap.

The implementation of hidden surface removal techniques involves use of the depth buffer 86. The first graphics processor 60 calculates interpolated pixel depth and calculates interpolated pixel color information for pixels involved in displaying images on the screen 48. For each such pixel, the first graphics processor 60 reads a currently stored depth value from a corresponding pixel depth element of the depth buffer 86. It compares the currently stored depth value for that pixel to the calculated (interpolated) depth value for the pixel. If the calculated depth value is closer than the currently stored depth value, then the first graphics processor writes the newly calculated depth value into the depth storage element corresponding to the pixel under consideration; it also writes the newly calculated color value for that pixel into the color storage element corresponding to the pixel. Otherwise, it leaves the currently stored depth and color values unchanged for the pixel under consideration.

In the course of applying the hidden surface technique, a floating point depth value (Z) in the range $0 \leq Z \leq 1$, provided by an application program running on the main processor 41 is converted into a 24-bit binary depth value. This conversion is performed so that the provided depth value can be readily used to compute calculated (interpolated) depth values for comparison with 24-bit values currently stored in the depth buffer 86. Furthermore, since each pixel storage element of the depth buffer is initialized with a 24-bit depth value corresponding to the background color, it is necessary to scale the converted depth value provided by the application process to compensate for this initialization.

In the presently preferred embodiment, this scaling is performed as follows. The binary background color value is converted to a floating point value. For a binary background color value less than $2^{23}$, the converted binary depth value is:

$$\text{depth} = (\text{background color value}) + ((2^{24} - 1) - \text{background color value}) * Z$$

For a binary background color value greater than $2^{23}$ the converted binary depth value is:

$$\text{depth} = (\text{binary background color value } * Z_c.$$

It will be appreciated that scaling in this manner ensures that a larger range of scaled depth values is available for use during the application of hidden surface removal techniques.

It will be understood that the first graphics processor 60 can render pixel depth and pixel color information for multiple images in a view. In cases where images overlap, the above-described surface-hiding technique ensures that more distant images (or more distant portions thereof) are hidden behind closer images.

Figure 5A:
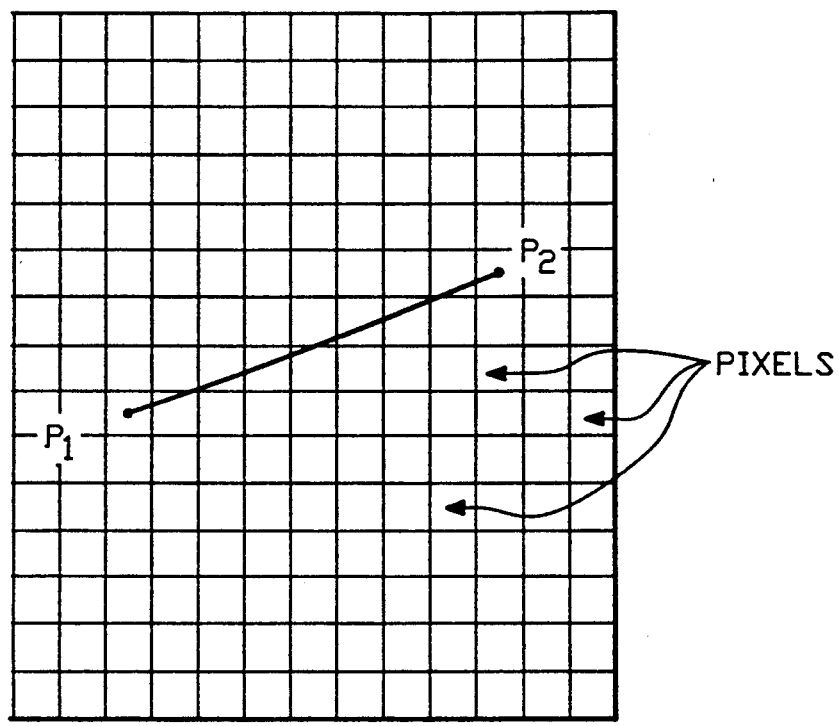

The operation of the data processing system 40 to produce an image of a line segment on the screen 48 now will be explained in more detail in the context of an example which is described below. The example will focus on the steps involved in illuminating pixels to produce an image of line segment $P_1P_2$ shown in the illustrative drawing of FIG. 5a.

The graphics processors 60, 62 produce pixel color, depth and intensity values for storage by the memory units 64, 66 by performing linear interpolations using a plane equation of the form:

$$Q = -\frac{a}{c} x - \frac{b}{c} y + \frac{a}{c} x1 + \frac{b}{c} y1 + Q1$$

where,
Q1=Ax1+By1+C
Q2=Ax2+By2+C
Q3=Ax3+By3+C where, Q represents red, green or blue values for color interpolations; represents Z values for depth interpolations; and represents $\alpha$ values for intensity interpolations.

While linear interpolation is used in the presently preferred embodiment, it will be appreciated that alternate approaches could be employed to compute pixel color and depth information such as quadratic interpolation.

The main processor 41 provides to the interface unit 58 geometric and color information $P_1(X_1Y_1R_1G_1B_1Z_1)$ and $P_2(X_2Y_2R_2G_2B_2Z_2)$ about the end-points of the line segment $P_1P_2$. The coordinate pair $(X_1Y_1)$ and $(X_2Y_2)$ provides the location in the pixel array of the graphics screen 48 of the pixels that contain the end-points $P_1$ and $P_2$. Color information $(R_1G_1B_1)$ and $(R_2G_2B_2)$ respectively provide the colors of the end-points $P_1$ and $P_2$. Finally, depth information $Z_1$ and $Z_2$ provides the depth (distance from a viewer) of the end-points. Depth information is used, for example, in hidden surface removal in case some images on the screen 48 overlay other images on the screen. In the case of such overlaying, surfaces having "closer" depth values are portrayed and surfaces having "farther" depth values are hidden.

Figure 5B:
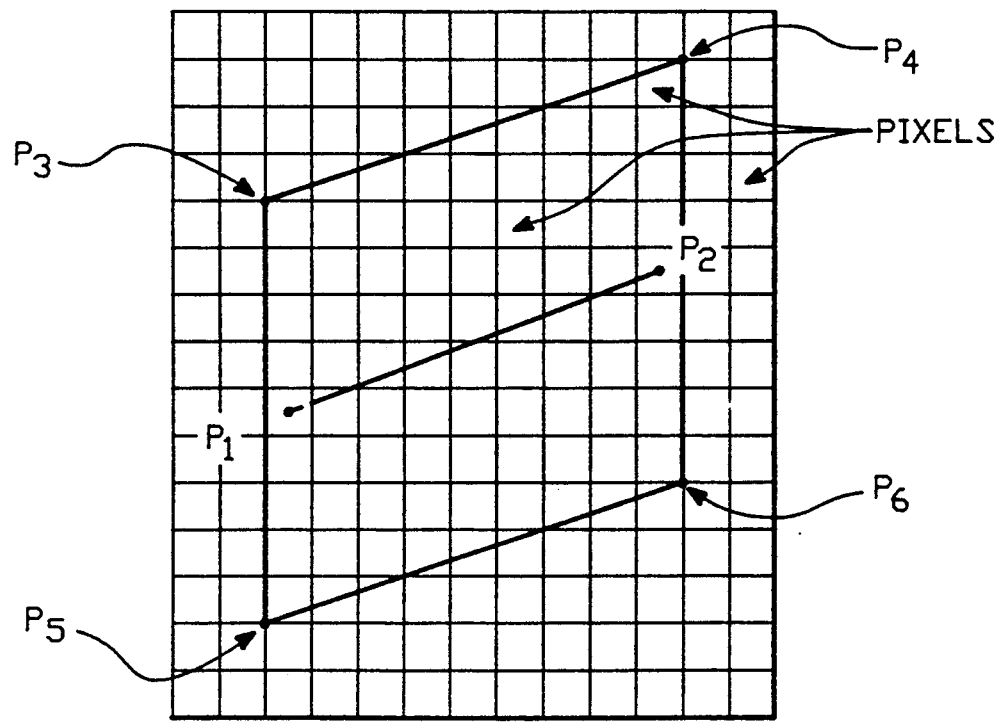

In response to the geometric and color information, the interface unit 58 produces parameters such as coordinates for a parallelogram, an intensity value ($\alpha$) scale, selected starting values to be used in performing linear interpolation and constant values to be used in performing linear interpolations. Referring to the illustrative drawing of FIG. 5b, there is shown a parallelogram ($P_3P_4P_5P_6$) which is bisected by the line segment $P_1P_2$, and which has opposed parallel edges which encompass pixels containing the end-points $P_1$ and $P_2$ of the line segment. It will be appreciated that the parallelogram denotes a planar region of the display screen 48.

The interface unit 58 produces an intensity scaling factor $\alpha$ which, as explained below, is used to progressively scale the intensity of illumination of pixels used to portray the line segment such that pixels vertically displaced farther from the line segment $P_1P_2$ less intensely are illuminated. In particular, referring to the following Table and to the illustrative drawings of FIG. 5c, the intensity values on the left edge of the parallelogram vary from $\alpha=0.0$ at $P_3$, to $\alpha=1.0$ at $P_1$, to $\alpha=2.0$ at $P_5$.

Similarly, the intensity values vary along the left edge of the parallelogram from $\alpha=0.0$ at $P_4$, to $\alpha=1.0$ at $P_2$, to $\alpha=2.0$ at $P_6$. As explained below, values of $\alpha$ in the range from 1.0 to 2.0 are mapped to a range from 1.0 to 0.0 in the course of interpolation calculations so as to produce $\alpha$ intensity values that progressively decrease with vertical distance from the line segment.

Figure 5C:
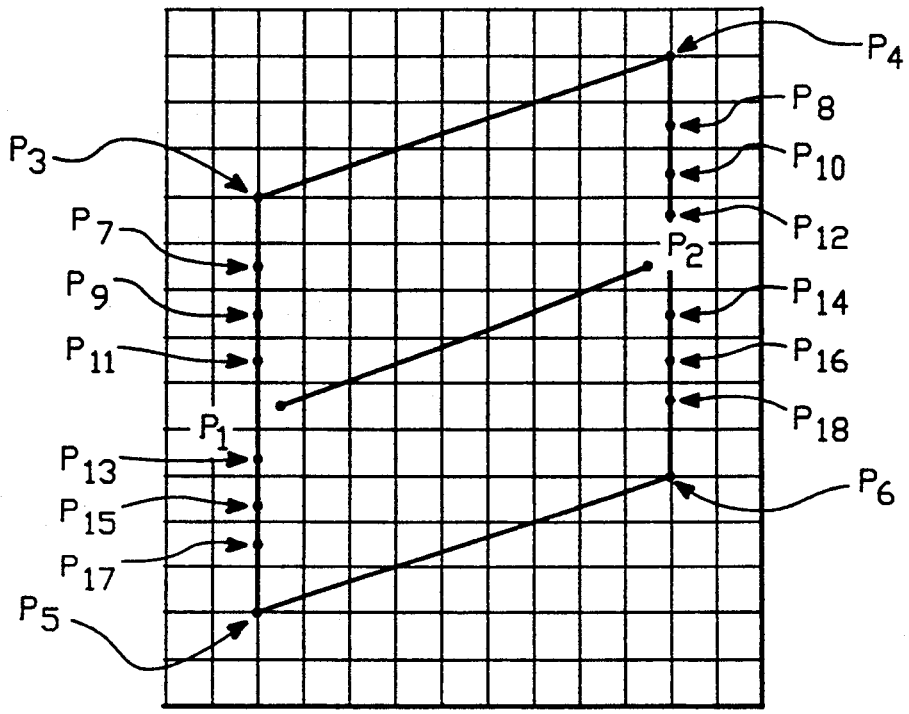
FIG. 5c illustrates the parallelogram of FIG. 5b in which individual pixels along opposed vertical edges have different assigned intensity ($\alpha$) values.
Figure 5D:
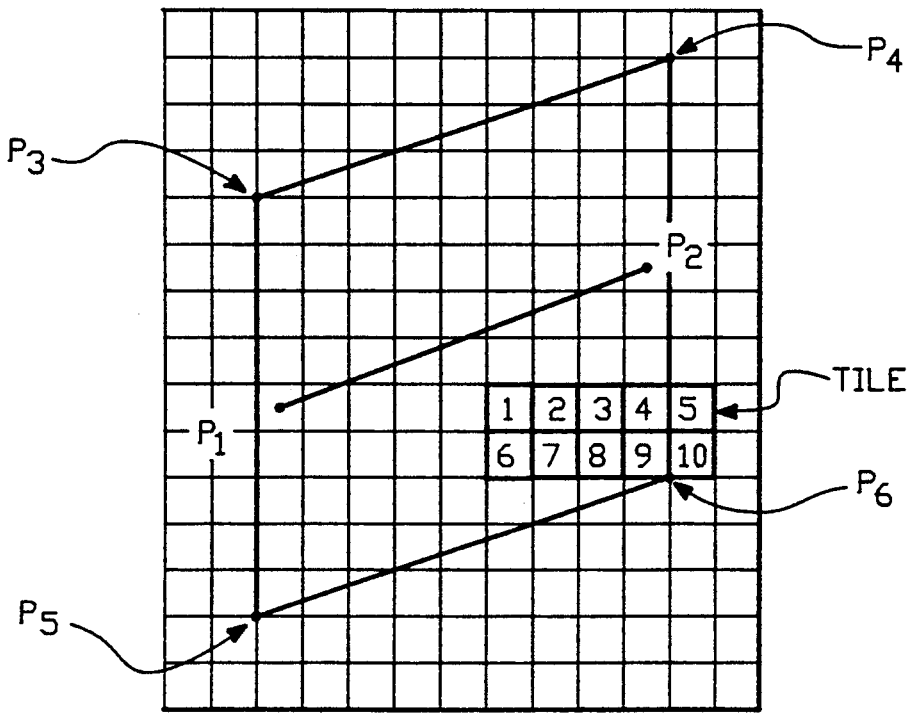
FIG. 5d illustrates the parallelogram of FIG. 5b and illustrates a tile element.

The following Table 1 shows assigned $\alpha$ values for points shown in FIG. 5c along the edge of the parallelogram.

TABLE 1

| Points | $\alpha$ |
| --- | --- |
| $P_3, P_4$ | 0.0 |
| $P_7, P_8$ | 0.25 |
| $P_9, P_{10}$ | 0.50 |
| $P_{11}, P_{12}$ | 0.75 |
| $P_1, P_2$ | 1.00 |
| $P_{13}, P_{14}$ | 1.25 |
| $P_{15}, P_{16}$ | 1.50 |
| $P_{17}, P_{18}$ | 1.75 |
| $P_5, P_6$ | 2.00 |

The interface unit 58 also selects three points encompassed by (and on the edges of) the parallelogram for use in interpolating color, depth and intensity information (RGBZ$\alpha$) for pixels encompassed by the parallelogram. For example, unit 58 could select points $P_3$, $P_4$ and $P_5$.

The (RGBZ$\alpha$) values for the three selected points then are used by the interface unit 58 to calculate $$\frac{-a}{c} = \frac{dQ}{dx} ; \frac{-b}{c} = \frac{dQ}{dy}$$

Q can represent red, green, blue, Z or $\alpha$. Thus, the interface unit 58 calculates: dR/dx, dR/dy dG/dx, dG/dy, dB/dx, dB/dy, dZ/dx, dZ/dy, d$\alpha$/dx and d$\alpha$/dy. In the presently preferred embodiment, a=(Y4−Y3)(Q5−Q4)−(Y5−Y4)(Q4−Q3)
b=(Q4−Q3)(X5−X4)−(Q5−Q4)(X4−X3)
c=(X4−X3)(Y5−Y4)−(X5−X4)(Y4−Y3)

where the respective (xy) coordinates of the selected points $P_3, P_4$ and $P_5$ are: (X3Y3), (X4Y4) and (X5Y5).

After the interface unit 58 has produced the parallelogram coordinates, has assigned $\alpha$ values, has selected three points encompassed by the parallelogram and has calculated the constant values listed above, the first and second graphics processors 60, 62 use this information both to determine which pixel image color storage elements are to be updated with new pixel color information in order to render an image of the $P_1P_2$ line segment and to actually interpolate updated pixel color and depth information.

Figure 6:
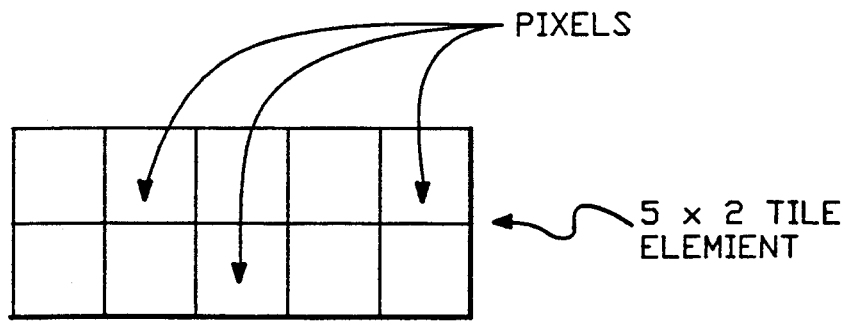

More particularly, the first and second graphics processors 60, 62 use an edge-seeking algorithm to determine which pixels are to be updated. In the presently preferred embodiment, an edge-seeking algorithm is used in which "tile" elements are employed. A "tile" element is a set of ten physically contiguous 24-bit pixels arranged on the screen 48 in a 5×2 pixel array. FIG. 6 illustrates a 5×2 tile element comprising ten pixels (numbered "1" through "10").

The screen 48 is divided into a multiplicity of such tile elements. Correspondingly, the memory units 64, 66 are organized such that for each tile element, there are ten logically contiguous pixel storage elements for storing color information. Also, there are ten logically contiguous pixel storage elements for storing depth information.

Figure 7:
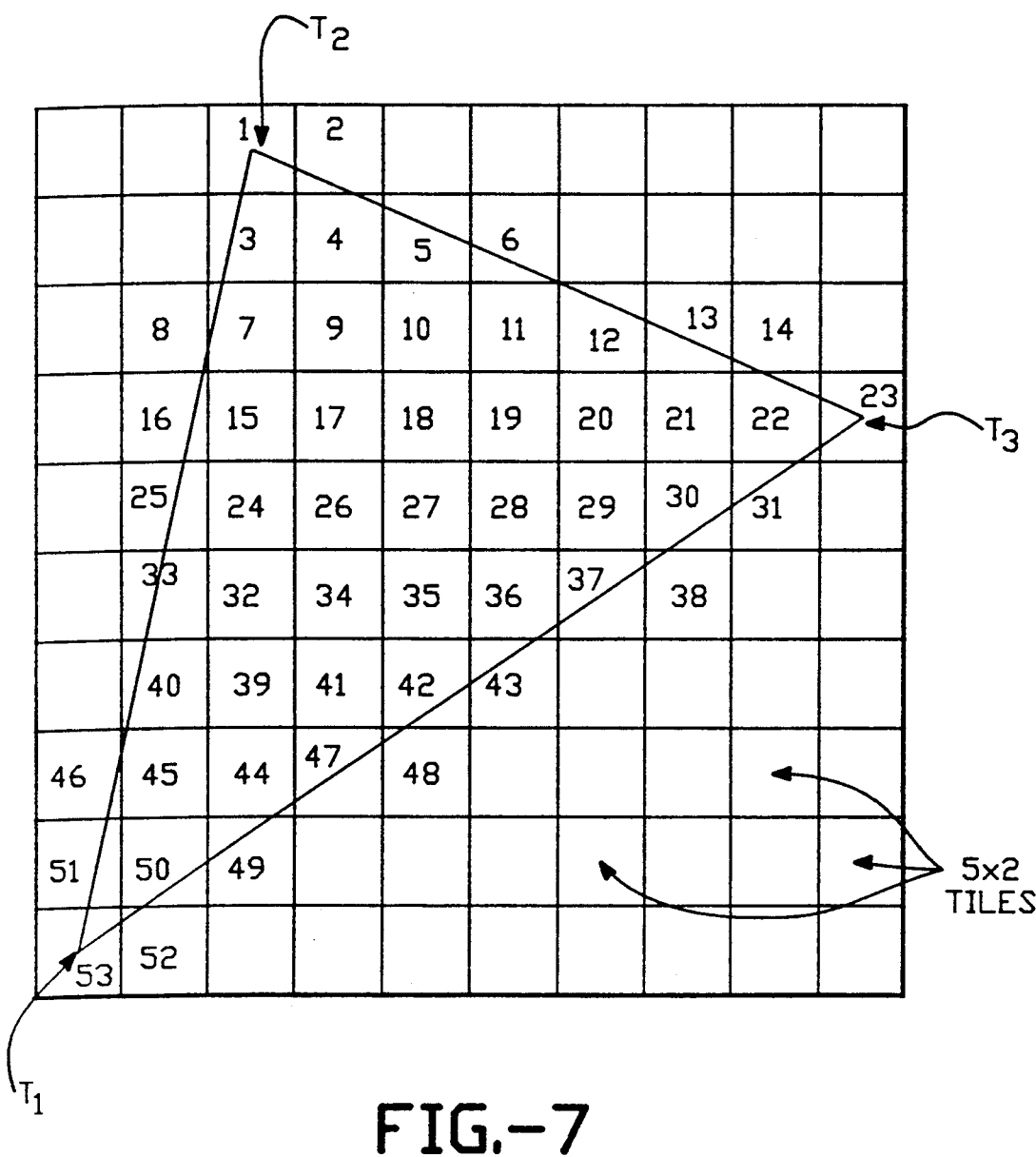
FIG. 7 shows a geometric figure in which an edge-seeking algorithm is applied to identify pixels encompassed by the geometric figure.

In brief, the edge-seeking algorithm operates as follows. A starting tile element is selected. In FIG. 7, that tile element is labeled "1". In a presently preferred form of the invention, the starting tile element is the tile element that contains the uppermost vertex of the geometric figure in question (in this example, triangle $T_1,T_2,T_3$). The algorithm first searches tile elements to the left of the starting tile element "1" for an edge running through any of them. In this example, it finds none. Next, the algorithm searches tile elements to the right of the starting tile element for an edge running through any of them. It determines that the tile element labeled "2" has an edge running through it. Next, the algorithm moves down to the coordinates of the tile element labeled "3" which is directly below the starting tile element "1". From the coordinates of tile element "3, it once again searches to the left and then to the right. The algorithm finds that tile elements labeled "3" through "6" are wholly or partially encompassed by edges of the triangle $T_1,T_2,T_3$. The algorithm determines that there is no bottom edge of the triangle through tile element "3". So, it moves down to the coordinates of the tile element labeled "7", and repeats its left, and then right search, and it identifies tile elements "8" and "7" and "9" through "14" as being wholly or partially encompassed. The algorithm proceeds in this manner until it identifies the last two tile elements wholly or partially encompassed. They are labeled "52" and "53" respectively. Although the above example of the use of an edge-seeking algorithm is provided for a triangle $T_1T_2T_3$, it will be understood that it can just as readily be applied to the parallelogram of FIGS. 5a–5d. Furthermore, while the presently preferred embodiment employs an edge-seeking algorithm, it will be appreciated that other more traditional approaches can be used to identify pixels or tile elements encompassed by the parallelogram.

The first and second graphics processors 60, 62 interpolate color, depth and intensity values for pixels of tile elements found to be wholly or partially encompassed by a geometric figure in question. Referring to the illustrative drawing of FIG. 5d, for example, there is shown a tile element comprising a 5×2 array of pixels labelled "1" through "10" found, through application of the edge-seeking algorithm, to be (partially) encompassed by the parallelogram $P_3P_4P_5P_6$ Pixels "1" through "4" and "6" through "9" are encompassed within the parallelogram. Pixels "5" and "10" are disposed outside the parallelogram. Since the tile element is (partially) encompassed by the parallelogram, the planar equation discussed above is used for each pixel in the tile element to interpolate color (RGB), depth (Z) and intensity ($\alpha$) values for the respective pixel.

For each respective pixel in the tile element, a final red, green and blue color values are calculated from respective interpolated red, green and blue color values and a respective interpolated intensity value as follows:

$$COLOR_{final} = COLOR_{interpolated} * \alpha_{interpolated}$$

It will be appreciated that since the intensity value ($\alpha$) decreases with vertical distance from the line segment, pixels displaced vertically farther from the line segment tend to gradually fade-out, leading to a reduced staircase effect.

Figure 8:
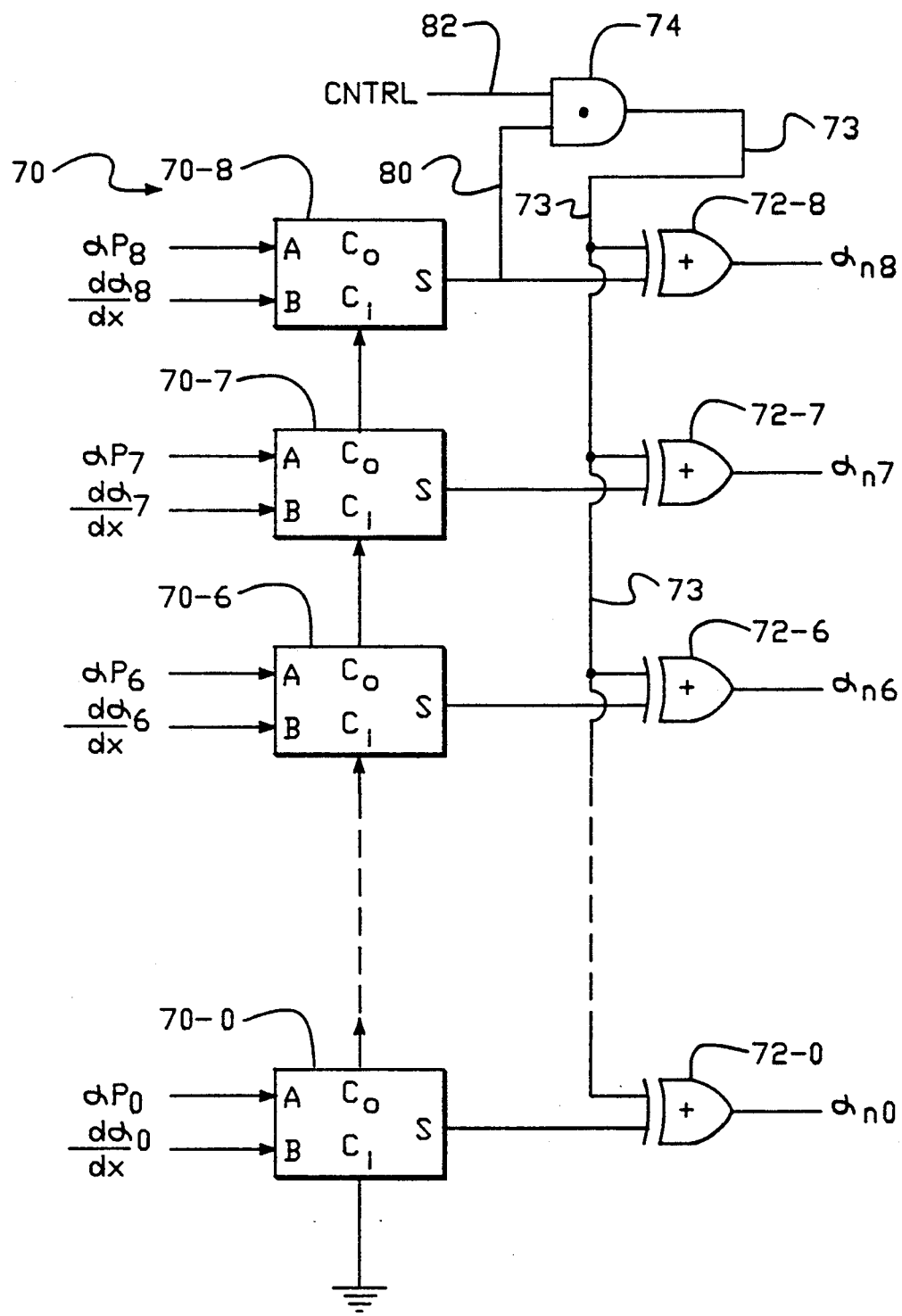

As mentioned above, the $\alpha$ (intensity) values falling in the range from $1.0 < \alpha \leq 2.0$ must be mapped to a range from $1.0 < \alpha \leq 0.0$ before being applied to the above equation used to compute $COLOR_{final}$. In a present embodiment of the invention, an underflow/overflow (U/0) correction circuit 68 illustrated in the schematic diagram of FIG. 8 is used to achieve such mapping.

The U/0 circuit 68 includes a computational unit, in the form of a nine-bit adder 70, a plurality of inverting mechanisms, in the form of nine Exclusive-OR gates 72, and a control unit, in the form in an AND gate 74. The nine-bit adder 70 comprises nine one-bit adders 70-0 through 70-8 coupled in a carry-chain. The respective one-bit address 70-0 through 70-8 of the nine-bit adder 72 have respective outputs coupled to respective first inputs 76-0 through 76-8 of the respective exclusive-OR gates 72-0 through 72-8. The output 73 of the AND gate 74 is coupled to respective second inputs 78-0 through 78-8 of the Exclusive-OR gates 72-0 through 72-8. A first input 80 of the AND gate 74 is coupled to the output of the ninth one-bit adder 70-8, the highest order one-bit adder in the carry-chain. A second input 82 to the AND gate 74 is coupled to receive a control signal.

In operation, the U/0 circuit 68 can both interpolate next intensity values $\alpha_n$ and map such interpolated intensity values from the range from $1.0 < \alpha \leq 2.0$ to the range from $1.0 < \alpha \leq 0.0$. In particular, the "A" inputs of the nine-bit adder 70 receive an eight bit previously interpolated intensity value $\alpha_p$ which comprises nine bits ($\alpha_{po}$ through $\alpha_{p8}$). The "B" inputs of the nine-bit adder 70 receive a constant value $d\alpha/dx$, for example, which comprises nine bits $d\alpha_i/dx$ ($d\alpha_o/dx$ through $d\alpha_8/dx$). The lowest order previously interpolated intensity value and the constant bit $d\alpha_o/dx$ are provided to one-bit adder 70-0. The highest order previously interpolated intensity value bit $\alpha_{p8}$ and the constant bit $d\zeta_8/dx$ are provided to one-bit adder 70-7. It should be appreciated that the following discussion can be applied to computation of $d\alpha$as well. dy The U/0 circuit 68 interpolates a nine-bit next intensity value $\alpha_n$ which comprises eight bits $a_ni$; ($\alpha_{no}$ through $\alpha_{n8}$). As long as the real number value of the next intensity value $\alpha_n$ is within the range $0.0 \leq \alpha_n \leq 1.0$ then the value of the next highest order intensity bit, $\alpha_{n8}$, is logical "zero". If the real number value of the highest order intensity value $\alpha_n$ is in the range $1.0 < \alpha_n \leq 2.0$, then the next highest order intensity bit, $\alpha_{n8}$, is a logical "one".

By providing a logical "one" control signal to the second input 82 of the AND gate 74, the AND gate 74 is caused to provide on line 73, is a logical "one" signal only when the highest order intensity bit, $\alpha_{n8}$, is logical "one". The result of a logical one signal on line 73 is to cause the respective Exclusive-OR-gates 72-0 through 72-7 to invert bits provided to them by the respective one-bit adders 70-0 through 70-7. This inverting advantageously, can be used to map intensity values in the range $1.0 < \alpha_n \leq 2.0$ into the range $0.0 < \alpha_n \leq 1.0$ as illustrated in the following table 2.

TABLE 2

| α Assigned Floating Point | α Assigned Hex | α Mapped Hex Mapped |
|---|---|---|
| 0.0 | 0X00 | — |
| 0.25 | 0X40 | — |
| 0.50 | 0X80 | — |
| 1.0 | 0XFF | — |
| 1.5 | 0X180 | 0X7F |
| 1.75 | 0X1C0 | 0X3F |
| 2.0 | 0X1FF | 0X0 |

Referring to the illustrative drawing of FIG. 5c and to Tables 1 and 2, it will be appreciated that the operation of the U/0 circuit 68 can be used to map next intensity values $\alpha_n$ in hexadecimal form, from the range $1.0 < \alpha_n \leq 2.0$ onto the range $0.0 < \alpha_n < 1.0$. Furthermore, it will be appreciated that the U/0 circuit 68 performs this mapping such that next interpolated intensity values, $a_n$, for pixels decrease with increasing vertical distance of the pixels from the line segment. Moreover, such decrease occurs at approximately the same rate for pixels lying above as for pixels lying below the line segment $P_1P_2$.

Figure 9:
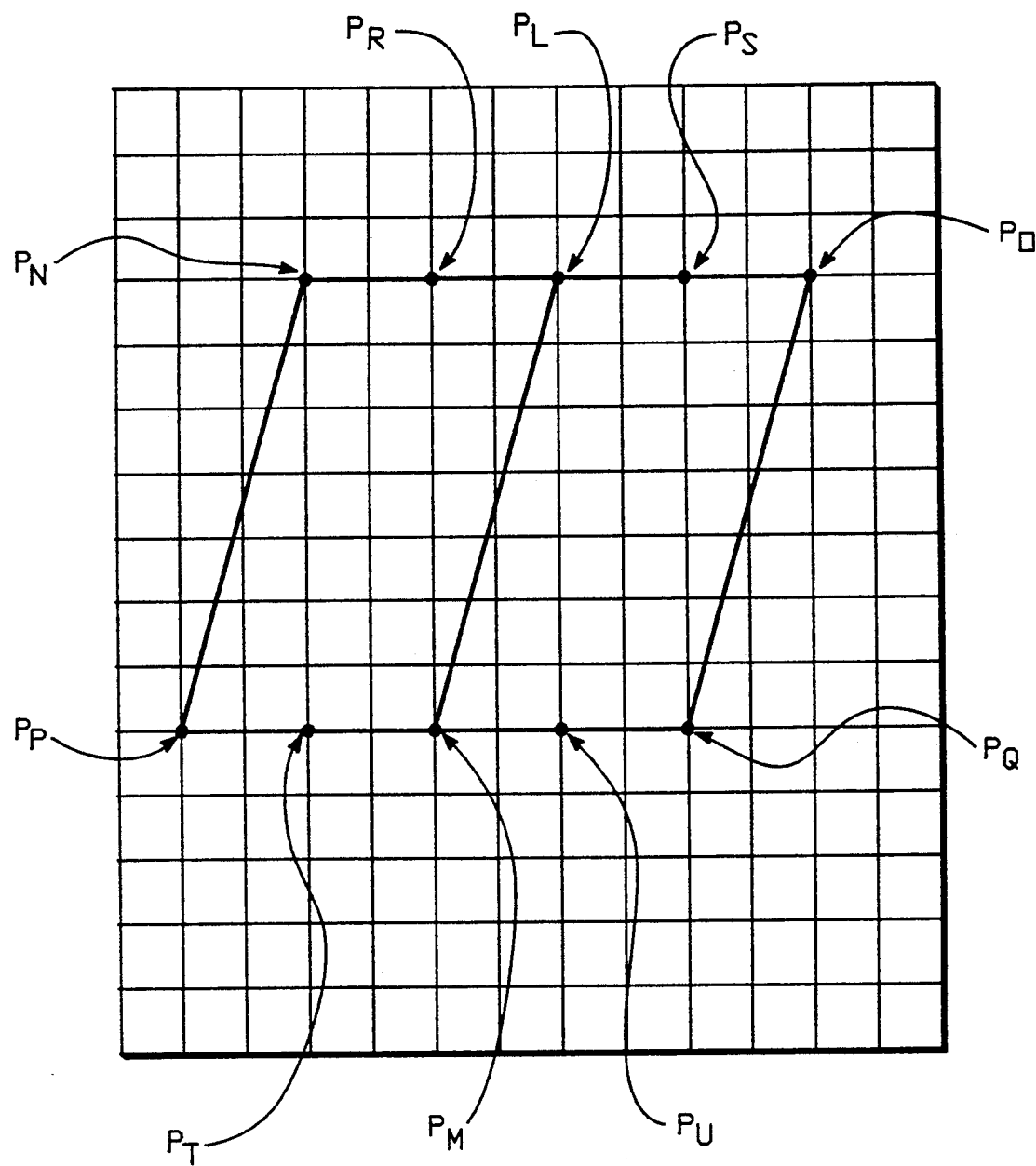
FIG. 9 illustrates an alternative parallelogram in which intensity values are assigned along opposed horizontal edges.

Referring to the illustrative drawing of FIG. 9, there is shown a parallelogram on which an intensity value ($\alpha$) scale has been assigned for points along opposed horizontal axes of the parallelogram. The intensity value scale for the parallelogram in FIG. 9 is set forth in the following Table 3:

TABLE 3

| Points | $\alpha$ |
| --- | --- |
| $P_n, P_o, P_p, P_q$ | 0.0 |
| $P_r, P_s, P_t, P_u$ | 0.5 |
| $P_l, P_m$ | 1.0 |

In the case of the parallelogram in FIG. 9, the graphics unit 42 performs interpolations for color, depth and intensity values in the two parallelogram regions $P_nP_oP_lP_m$ and $P_lP_mP_pP_q$ which are bisected by line segment $P_lP_m$. The U/0 correction circuit 68 is not employed to map intensity values since the intensity value ($\alpha$) already is properly scaled.

While one embodiment of the invention has been described in detail herein, it will be appreciated that various modifications can be made to the preferred embodiment without departing from the scope of the invention. Thus, the foregoing description is not intended to limit the invention which is defined in the appended claims in which:

What is claimed is:

1. In a graphics image rendering system including a graphics processor, a graphics display screen, double buffer means for storing pixel color information and depth buffer means for storing pixel depth information, a method for initializing the depth buffer means and the double buffer means comprising the steps of:

writing to each pixel storage element of the double buffer means a binary value representing a background color to appear on the graphics display screen; and writing to each pixel storage element of the depth buffer means the binary value representing the background color to appear on the graphics display screen.

2. The method of claim 1 and further including the step of:

transferring both the binary values for storage by the pixel storage elements of the double buffer means and the binary values for storage by the pixel storage elements of the depth buffer means on a shared data bus between the graphics processor and the double buffer means and between the graphics processor and the depth buffer means.

3. The method of claim 1 wherein said steps of writing and performed in parallel.

4. In a graphics image rendering system including a graphics processor, a graphics display screen, double buffer means for storing pixel color information and depth buffer means for storing pixel depth information, a method for initializing the depth buffer means and the double buffer means comprising the steps of:

writing to each pixel storage element of the double buffer means a binary value representing a background color to appear on the graphics display screen; and writing to each pixel storage element of the depth buffer means the binary value representing the background color to appear on the graphics display screen;

wherein said steps of writing are performed in parallel; and in the course of said steps of writing, transferring both the binary values for storage by the pixel storage elements of the double buffer means and the binary values for storage by the pixel storage elements of the depth buffer means on a shared data bus between the graphics processor and the double buffer means and between the graphics processor and the depth buffer means.

5. In a graphics image rendering system including a graphics processor, a graphics display screen, double buffer means for storing pixel color information and depth buffer means for storing pixel depth information, a method for rendering a graphics image comprising the steps of:

(a) periodically writing to each pixel storage element of the double buffer means a binary value representing a background color to appear on the graphics display screen;

(b) periodically writing to each pixel storage element of the depth buffer means the binary value representing the background color to appear on the graphics display screen; and (c) for each respective pixel of the graphics display screen, (d) calculating a depth value for a respective corresponding pixel storage element of the depth buffer means by mapping to a depth value scaled according to the binary value representing the background color;

(e) calculating a color value for a respective corresponding pixel storage element of the double buffer means;

(f) reading a currently stored depth value from the respective corresponding pixel storage element of the depth buffer means;

(g) comparing the respective calculated depth value to the respective currently stored depth value; and (h) if the respective calculated depth value represents a lesser depth than the respective currently stored depth value, then (i) writing the respective calculated depth value into the corresponding respective pixel storage element of the depth buffer means, and (ii) writing the respective calculated color value into the corresponding pixel storage element of the double buffer means.

6. The method of claim 5 and further including the step of:

transferring both the binary values for storage by the pixel storage elements of the double buffer means and binary values for storage by the pixel storage elements of the depth buffer means on a shared data bus between the graphics processor and the double buffer means and between the graphics processor and the depth buffer means.

7. The method of claim 5 wherein said steps of periodically writing are performed in parallel.

8. The method of claim 5 wherein said step of calculating a depth value includes performing a linear interpolation.

9. The method of claim 5 wherein said step of calculating a color value includes performing a linear interpolation.

10. The method of claim 5 wherein said step of calculating the depth value includes, scaling a depth value Z depth according to an equation:

depth = binary background color value $+ ((2^n - 1) -$ background color value$) * Z$, for background color binary value $< 2^{n-1}$, and according to an equation depth (binary background color value) $* Z$ for background color value $> 2^{n-1}$, where n is the number of pixels per pixel storage element.

* * * * *

UNITED STATES PATENT AND TRADEMARK OFFICE
CERTIFICATE OF CORRECTION

PATENT NO. : 5,008,838
DATED : April 16, 1991
INVENTOR(S) : Brian M. Kelleher et al.

It is certified that error appears in the above-identified patent and that said Letters Patent is hereby corrected as shown below:

Column 9,
Line 22, after "respectively." begin a new paragraph

Column 11,
Line 58, delete "and" and insert therefor -- are --

Column 14,
Line 4, after "depth" insert an equals sign

Signed and Sealed this

Twenty-first Day of June, 2005

JON W. DUDAS
*Director of the United States Patent and Trademark Office*